United States Patent
Levy et al.

(10) Patent No.: US 11,502,957 B2
(45) Date of Patent: Nov. 15, 2022

(54) AVOIDING MARKERS FOR LONGEST PREFIX MATCH BASED ON BINARY SEARCH TREE ALGORITHM

(71) Applicant: MELLANOX TECHNOLOGIES TLV LTD., Raanana (IL)

(72) Inventors: Gil Levy, Hod Hasharon (IL); Aviv Kfir, Nili (IL); Matty Kadosh, Hadera (IL); Salvatore Pontarelli, Rome (IT); Pedro Reviriego, Madrid (ES)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 44 days.

(21) Appl. No.: 17/224,208

(22) Filed: Apr. 7, 2021

(65) Prior Publication Data

US 2021/0359943 A1   Nov. 18, 2021

Related U.S. Application Data

(60) Provisional application No. 63/024,531, filed on May 14, 2020.

(51) Int. Cl.
*H04L 45/748* (2022.01)
*H04L 45/02* (2022.01)
(Continued)

(52) U.S. Cl.
CPC .......... *H04L 45/748* (2013.01); *H04L 45/02* (2013.01); *H04L 45/26* (2013.01); *H04L 45/42* (2013.01); *H04L 45/7453* (2013.01)

(58) Field of Classification Search
CPC ......... H04L 45/02; H04L 45/26; H04L 45/42; H04L 45/48; H04L 45/74; H04L 45/745;
(Continued)

(56) References Cited

U.S. PATENT DOCUMENTS 6,754,662 B1   6/2004  Li et al.
9,160,650 B2  10/2015  Zhang et al.
(Continued)

FOREIGN PATENT DOCUMENTS

EP   1533956 A2 *  5/2005  ............. H04L 45/00
EP   2562978 A1 *  2/2013  ............. H04L 45/54

OTHER PUBLICATIONS

Gupta et al., "Routing Lookups in Hardware at Memory Access Speeds", Proceedings of the Conference on Computer Communications (IEEE INFOCOMM), vol. 3, pp. 1241-1248, San Francisco, USA, Mar./Apr. 1998.
(Continued)

*Primary Examiner* — Jenee Holland
(74) *Attorney, Agent, or Firm* — Kligler & Associates Patent Attorneys Ltd

(57) ABSTRACT

In one embodiment, a packet processing apparatus includes interfaces, a memory to store a representation of a routing table as a binary search tree of address prefixes, and store a marker with an embedded prefix including k marker bits providing a marker for an address prefix of a node corresponding to a prefix length greater than k, and n additional bits, such that the k marker bits concatenated with the n additional bits provide another address prefix, packet processing circuitry configured upon receiving a data packet having a destination address, to traverse the binary search tree to find a longest prefix match, compare a key with the k marker bits, extract an additional n bits from the destination address, and compare the extracted n bits with the n additional bits, and process the data packet in accordance with a forwarding action indicated by the longest prefix match.

18 Claims, 6 Drawing Sheets

(51) Int. Cl.
*H04L 45/00* (2022.01)
*H04L 45/42* (2022.01)
*H04L 45/7453* (2022.01)
*H04L 45/48* (2022.01)

(58) Field of Classification Search
CPC ... H04L 45/7453; H04L 45/748; H04W 40/24
See application file for complete search history.

(56) References Cited

U.S. PATENT DOCUMENTS

| | | | |
|---|---|---|---|
| 9,596,181 | B1 | 3/2017 | Goel et al. |
| 10,135,734 | B1* | 11/2018 | Singh ................. H04L 45/7453 |
| 10,148,571 | B2 | 12/2018 | Kfir et al. |
| 10,171,419 | B2 | 1/2019 | Kravchik et al. |
| 10,200,312 | B1* | 2/2019 | Singh ................. H04L 41/0833 |
| 10,397,115 | B1* | 8/2019 | Hasani ............... H04L 45/7453 |
| 10,491,521 | B2 | 11/2019 | Levy et al. |
| 10,515,015 | B2 | 12/2019 | Levy et al. |
| 10,616,113 | B2 | 4/2020 | Levy et al. |
| 10,684,960 | B2 | 6/2020 | Levy et al. |
| 11,341,136 | B2* | 5/2022 | Miller ................. G06F 16/2455 |
| 2001/0028651 | A1 | 10/2001 | Murase |
| 2004/0085953 | A1* | 5/2004 | Davis ................. H04L 45/74591 370/356 |
| 2005/0038907 | A1 | 2/2005 | Roeder et al. |
| 2005/0091443 | A1 | 4/2005 | Hershkovich et al. |
| 2005/0114393 | A1* | 5/2005 | Wilson ................. H04L 45/00 |
| 2005/0175010 | A1* | 8/2005 | Wilson ................. H04L 45/54 370/395.32 |
| 2006/0173831 | A1* | 8/2006 | Basso ................. H04L 12/66 |
| 2008/0112412 | A1* | 5/2008 | Pong ................. H04L 45/00 370/392 |
| 2008/0112413 | A1* | 5/2008 | Pong ................. H04L 45/745 711/216 |
| 2008/0212586 | A1 | 9/2008 | Wang et al. |
| 2009/0077076 | A1 | 3/2009 | Berger et al. |
| 2010/0023727 | A1* | 1/2010 | Lim ................. H04L 45/745 711/216 |
| 2010/0040066 | A1 | 2/2010 | Hao et al. |
| 2010/0080223 | A1 | 4/2010 | Wong et al. |
| 2012/0246411 | A1 | 9/2012 | Birka et al. |
| 2013/0297879 | A1 | 11/2013 | Abali et al. |
| 2014/0122791 | A1* | 5/2014 | Fingerhut ............... G11C 15/00 711/108 |
| 2015/0039836 | A1 | 2/2015 | Wang et al. |
| 2015/0098470 | A1* | 4/2015 | Sun ................. H04L 45/748 370/392 |
| 2015/0131665 | A1 | 5/2015 | Griswold |
| 2016/0335296 | A1 | 11/2016 | Sathe et al. |
| 2017/0366502 | A1* | 12/2017 | Kravchik ............... H04L 45/74 |
| 2018/0109454 | A1* | 4/2018 | Holmberg ............. H04L 45/748 |
| 2018/0212877 | A1* | 7/2018 | Wickeraad ........... H04L 45/748 |
| 2019/0095490 | A1* | 3/2019 | Colgrove ............. G06F 16/2255 |
| 2019/0140951 | A1* | 5/2019 | Hong ................. H04L 45/745 |
| 2019/0294549 | A1* | 9/2019 | Levy ................. H04L 45/742 |
| 2020/0028781 | A1* | 1/2020 | Levy ................. H04L 45/48 |
| 2021/0211140 | A1* | 7/2021 | Li ................. H03M 7/42 |

OTHER PUBLICATIONS

Kasnavi et al., "A cache-based internet protocol address lookup architecture", Computer Networks, vol. 52, pp. 303-326, year 2008.

Kim et al., "Revisiting Route Caching: TheWorld Should Be Flat", Proceedings of the 10th International Conference on Passive and Active Network Measurement (PAM), pp. 1-10, Seoul, Korea, Apr. 1-3, 2009.

Kohler et al., "Observed Structure of Addresses in IP Traffic", IEEE/ACM Transactions on Networking, vol. 14, No. 6, pp. 1207-1218, Dec. 2006.

Liu et al., "Efficient FIB Caching using Minimal Non-overlapping Prefixes", ACM SIGCOMM Computer Communication Review, vol. 43, No. 1, pp. 15-21, Jan. 2013.

Sarrar et al., "Leveraging Zipf's Law for Traffic Offloading", ACM SIGCOMM Computer Communication Review, vol. 42, No. 1, pp. 17-22, Jan. 2012.

WAND Network Research Group, pp. 1-7, Apr. 22, 2010 (downloaded from http://wand.net.nz/wits/catalogue.php).

The CAIDA Anonymized Internet Traces 2014 Dataset, pp. 1-2, year 2014, downloaded from https://www.caida.org/data/passive/passive_2014_dataset.xml.

Waldvogel et al., "Scalable High-Speed Prefix Matching", ACM Transactions on Computer Systems, vol. 19, Issue 4, pp. 440-482, Nov. 2001.

Levy et al., "Flexible Packet Matching with Single Double Cuckoo Hash," IEEE Communications Magazine, vol. 55, No. 6, pp. 212-217, Jun. 2017.

Reviriego et al., "Improving Energy Efficiency of Ethernet Switching with Modular Cuckoo Hashing," 2015 IEEE Online Conference on Green Commuications (OnlineGreenComm), pp. 7-10, year 2015.

Waldvogel et al., "Scalable High-Speed IP Routing Lookups", ACM SIGCOMM Conference, Cannes, France, pp. 25-36, Sep. 15-19, 1997.

* cited by examiner

AVOIDING MARKERS FOR LONGEST PREFIX MATCH BASED ON BINARY SEARCH TREE ALGORITHM

RELATED APPLICATION INFORMATION

The present application claims priority from U.S. Provisional Patent Application Ser. 63/024,531 of Levy, et al., filed 14 May 2020, the disclosure of which is hereby incorporated herein by reference.

FIELD OF THE INVENTION

The present invention relates to packet network communications, and particularly, but not exclusively, to apparatus and methods for packet routing.

BACKGROUND

Modern Internet routers determine data routing based on searching for a packet destination Internet Protocol address (DIP) in a database of forwarding information known as a routing table. The routing table, rather than storing a full DIP, stores only some of the leading portion, known as a prefix. The prefix comprises some number of the most significant bits (MSB) of the DIP. The remaining bits are treated as "don't care" bits for purpose of a DIP search in the routing table. Computers that belong to a subnetwork are addressed by a common prefix in their IP address.

The most specific of the matching table entries—the one with the longest subnet mask—is called the longest prefix match (LPM). This is the entry in the routing table in which the largest number of leading address bits of the destination address match those in the table entry. The router selects this entry to route the packet.

In high-speed routers, an LPM implementation generally needs to handle billions of packets per second and thus needs to operate at very high speed. Searching the routing table for the LPM is a bottleneck in routing throughput. Implementing LPM is challenging, as the DIP of each incoming packet has to be compared against the entries of the routing table, which can be very large, for example more than 900,000 entries, in order to find the best (longest) prefix match. Additionally, storing all the prefixes on chip (that is beneficial for speed) is increasingly difficult.

Various hardware-based solutions have been proposed, but the circuitry required to implement such solutions becomes complex. Moreover, the increasing amount of Internet traffic and demands for reduced latency have resulted in relatively costly router circuitry having high power consumption and heat dissipation.

One option is to use Ternary Content Addressable Memories (TCAM) to perform LPM in one memory access. TCAMs however have several drawbacks. First, they are much more costly in terms of area and power than standard SRAM memories and therefore, only a limited amount of TCAM bits can be placed inside an Integrated Circuit (IC). Second, while an SRAM can be used for several functions, for example to store exact match entries, actions associated with entries, counters, etc. a TCAM can only be used to match incoming packets. This limits the flexibility of the device and is an aspect that is increasingly important as Software Defined Networks (SDN) become widespread.

Due to the above issues, many modern implementations of LPM rely on hash-based structures, performing several exact match lookups to find the LPM. For example, a popular algorithm is a method described in an article entitled, "Scalable High-Speed Prefix Matching," by Waldvogel et al., published in Proceedings of the ACM SIGCOMM '97 Conference on Applications, Technologies, Architectures, and Protocols for Computer Communication, pages 25-36 (1997), which is incorporated herein by reference. Waldvogel et al. implements LPM with a binary search on prefix lengths. The algorithm has a worst case of five hash lookups for IPv4 and seven for IPv6 with the average being significantly lower in most configurations. For the binary search to work, in addition to the prefixes, special entries denoted as markers are added to the tree to guide the search to the LPM. This means that the storage requirements for a given table are larger than the number of prefixes and that the overhead cannot be known beforehand as it depends on the tree and prefixes. This limits the size of routing tables that can be supported on chip.

Hashing for packet processing is discussed in a paper written by G. Levy, S. Pontarelli and P. Reviriego, entitled "Flexible Packet Matching with Single Double Cuckoo Hash," in IEEE Communications Magazine, vol. 55, no. 6, pp. 212-217, June 2017, doi: 10.1109/MCOM.2017.1700132, and in a paper written by P. Reviriego, S. Pontarelli and G. Levy, entitled "Improving energy efficiency of Ethernet switching with modular Cuckoo hashing," 2015 IEEE Online Conference on Green Communications (OnlineGreenComm), Piscataway, N.J., USA, 2015, pp. 7-10, doi: 10.1109/OnlineGreenCom.2015.7387371, whose disclosures are incorporated herein by reference U.S. Patent Application Publication 2017/0366459, whose disclosure is incorporated herein by reference, describes an optimization of the solution described in the above-noted Waldvogel paper that can be easily implemented in hardware. The search jumps on a match to the next level of the tree that needs to be checked, thus reducing both the number of accesses and the number of markers. The jump captures most of the benefits that can be extracted from information provided by a match.

U.S. Pat. No. 10,616,113 to Levy, et al., whose disclosure is incorporated herein by reference, describes a method for packet processing including representing a routing table for a network as a binary search tree of address prefixes ordered by prefix lengths. For each node j in the binary search tree, a respective hash table is stored, including entries representing the address prefixes of length $L_j$. Each address prefix includes $L_{j-c}$ most significant bits (MSB) and c least significant bits (LSB), and each entry in the respective hash table includes a matching value corresponding to the $L_{j-c}$ MSB of one or more of the address prefixes and one or more action codes indexed by the c LSB of the one or more of the address prefixes. Upon receiving from the network a data packet having a destination address, the binary search tree is traversed to find a longest prefix match by performing, at each node j, a hash lookup in the respective hash table.

Documents incorporated by herein reference are to be considered an integral part of the application except that, to the extent that any terms are defined in these incorporated documents in a manner that conflicts with definitions made explicitly or implicitly in the present specification, only the definitions in the present specification should be considered.

SUMMARY

There is provided in accordance with an embodiment of the present disclosure, a packet processing apparatus, including a plurality of interfaces configured to receive and transmit data packets from and to a network, a memory, which is configured to store a representation of a routing table for the network as a binary search tree of address prefixes, the binary search tree being ordered by prefix lengths, such that each node j in the binary search tree corresponds to a respective prefix length Lj, store for each node j in the binary search tree, a respective hash table including entries representing the address prefixes of length Lj, each address prefix including Lj most significant bits (MSB), and each entry in the respective hash table including a matching value corresponding to a forwarding action, and store a marker with an embedded prefix as one of the entries in the respective hash table of a first one of the nodes, corresponding to a prefix length k, the marker with the embedded prefix including (a) k marker bits providing a marker for a first address prefix in the respective hash table of a second one of the nodes corresponding to a prefix length greater than k, (b) n additional bits, such that the k marker bits concatenated with the n additional bits provide a second one of the address prefixes in the respective hash table of the first node instead of in the respective hash table of a third one of the nodes corresponding to a prefix length k plus n, (c) a forwarding action, and packet processing circuitry configured, upon receiving through one of the interfaces a data packet having a destination address, to traverse the binary search tree to find a longest prefix match between the destination address and the address prefixes, extract, at each node j that is traversed, a key of length Lj from the destination address, and perform a hash lookup in the respective hash table with the key to find a matching entry, for the first node compare the key with the k marker bits of the marker with the embedded prefix, upon a match of the key with the k marker bits, extract an additional n bits from the destination address, and compare the extracted n bits of the destination address with the n additional bits of the marker with the embedded prefix, and process the data packet in accordance with the forwarding action indicated by the matching entry that corresponds to the longest prefix match.

Further in accordance with an embodiment of the present disclosure the marker with the embedded prefix includes an action field to check the n additional bits, and the packet processing circuitry is configured to compare the extracted n bits of the destination address with the n addition bits of the marker with the embedded prefix responsively to the action field to check the n additional bits.

Still further in accordance with an embodiment of the present disclosure the packet processing circuitry is configured to process the data packet in accordance with the forwarding action of the marker with the embedded prefix responsively to the extracted n bits of the destination address matching the n additional bits of the marker with the embedded prefix.

Additionally, in accordance with an embodiment of the present disclosure the binary search tree does not include any marker without an embedded prefix.

Moreover, in accordance with an embodiment of the present disclosure, the apparatus includes a controller configured to generate the marker with the embedded prefix responsively to the second address prefix in the respective hash table of the third node, and remove the second address prefix from the respective hash table of the third node.

Further in accordance with an embodiment of the present disclosure the controller is configured to select the second address prefix from a selection of the address prefixes responsively to the second address prefix having a longest prefix from among the selection of the address prefixes.

Still further in accordance with an embodiment of the present disclosure the binary search tree includes at least one marker without an embedded prefix.

Additionally, in accordance with an embodiment of the present disclosure the controller is configured to remove the n addition bits from the marker with the embedded prefix such that the marker with the embedded prefix becomes a marker without an embedded prefix.

Moreover, in accordance with an embodiment of the present disclosure the controller is configured to update the marker with the embedded prefix to refer to a third one of the address prefixes instead of referring to the second address prefix.

There is also provided in accordance with another embodiment of the present disclosure, a packet processing method, including receiving and transmitting data packets from and to a network, storing a representation of a routing table for the network as a binary search tree of address prefixes, the binary search tree being ordered by prefix lengths, such that each node j in the binary search tree corresponds to a respective prefix length Lj, storing for each node j in the binary search tree, a respective hash table including entries representing the address prefixes of length Lj, each address prefix including Lj most significant bits (MSB), and each entry in the respective hash table including a matching value corresponding to a forwarding action, storing a marker with an embedded prefix as one of the entries in the respective hash table of a first one of the nodes, corresponding to a prefix length k, the marker with the embedded prefix including (a) k marker bits providing a marker for a first address prefix in the respective hash table of a second one of the nodes corresponding to a prefix length greater than k, (b) n additional bits, such that the k marker bits concatenated with the n additional bits provide a second one of the address prefixes in the respective hash table of the first node instead of in the respective hash table of a third one of the nodes corresponding to a prefix length k plus n, (c) a forwarding action, and upon receiving a data packet having a destination address traversing the binary search tree to find a longest prefix match between the destination address and the address prefixes, extracting, at each node j that is traversed, a key of length Lj from the destination address, performing a hash lookup in the respective hash table with the key to find a matching entry, for the first node comparing the key with the k marker bits of the marker with the embedded prefix, upon a match of the key with the k marker bits, extracting an additional n bits from the destination address, and comparing the extracted n bits of the destination address with the n additional bits of the marker with the embedded prefix, and processing the data packet in accordance with the forwarding action indicated by the matching entry that corresponds to the longest prefix match.

Further in accordance with an embodiment of the present disclosure the marker with the embedded prefix includes an action field to check the n additional bits, the method further including comparing the extracted n bits of the destination address with the n addition bits of the marker with the embedded prefix responsively to the action field to check the n additional bits.

Still further in accordance with an embodiment of the present disclosure processing includes processing the data packet in accordance with the forwarding action of the marker with the embedded prefix responsively to the extracted n bits of the destination address matching the n additional bits of the marker with the embedded prefix.

Additionally, in accordance with an embodiment of the present disclosure the binary search tree does not include any marker without an embedded prefix.

Moreover, in accordance with an embodiment of the present disclosure, the method includes generating the marker with the embedded prefix responsively to the second address prefix in the respective hash table of the third node, and removing the second address prefix from the respective hash table of the third node.

Further in accordance with an embodiment of the present disclosure, the method includes selecting the second address prefix from a selection of the address prefixes responsively to the second address prefix having a longest prefix from among the selection of the address prefixes.

Still further in accordance with an embodiment of the present disclosure the binary search tree includes at least one marker without an embedded prefix.

Additionally, in accordance with an embodiment of the present disclosure, the method includes removing the n addition bits from the marker with the embedded prefix such that the marker with the embedded prefix becomes a marker without an embedded prefix.

Further in accordance with an embodiment of the present disclosure, the method includes updating the marker with the embedded prefix to refer to a third one of the address prefixes instead of referring to the second address prefix.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
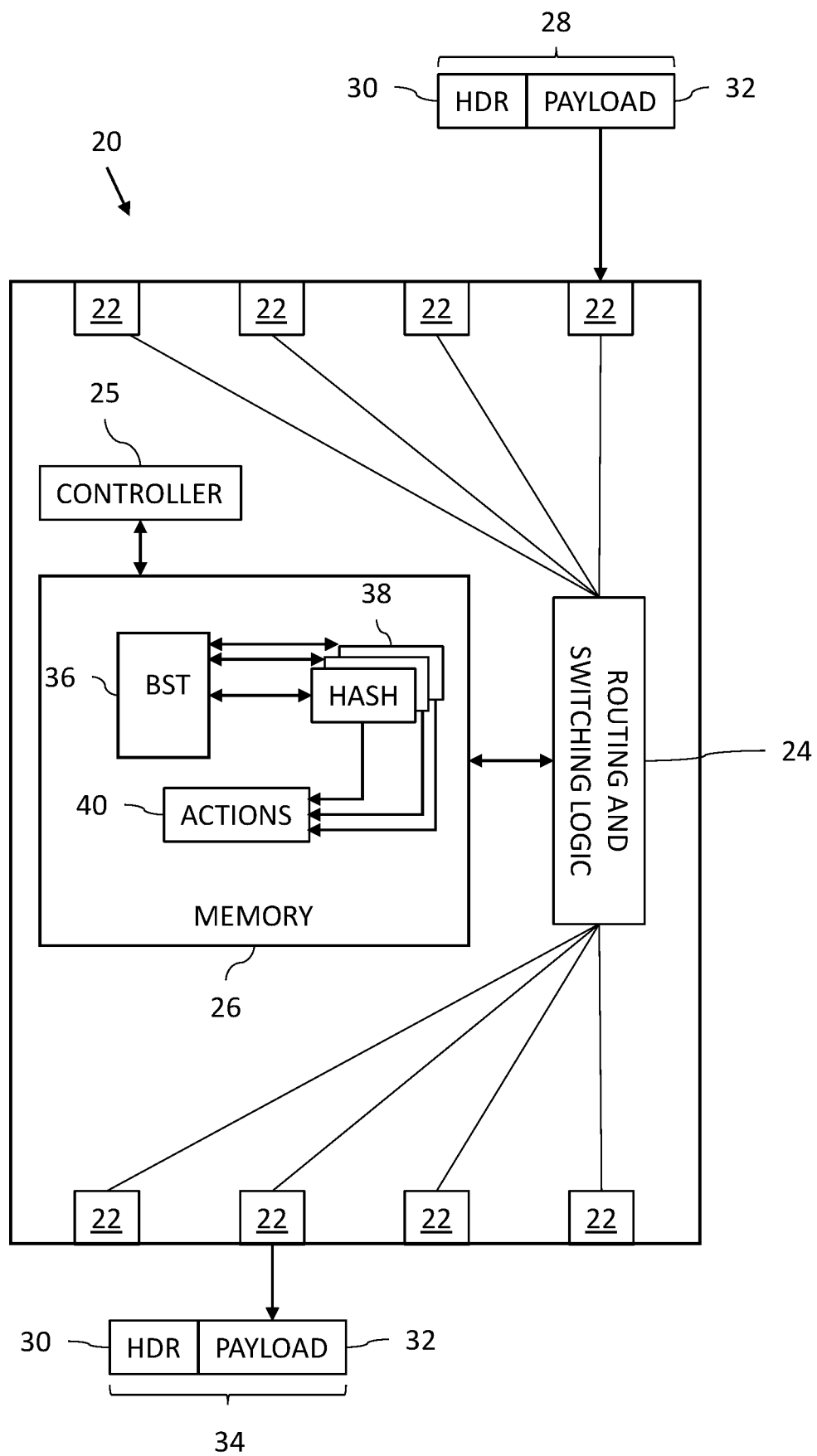
FIG. 1 is a block diagram that schematically shows a packet router, in accordance with an embodiment of the invention.

As explained in the above-mentioned article by Waldvogel et al., an IP routing table for a packet network can be efficiently represented as a binary search tree of address prefixes ordered by prefix lengths. In this representation, each node j in the binary search tree corresponds to a respective prefix length $L_j$. The value of the index "j" identifies the individual nodes of the binary search tree, and thus the term "node j," as used in the present description and in the claims, refers to any given node in the tree, with an arbitrary index value j. The binary search tree comprises a root node and two subtrees including parent nodes and descendant nodes (down to the leaf nodes), disposed in hierarchical levels of the subtrees.

Waldvogel et al. suggest that markers be inserted on some nodes of the tree to ensure that the search leads to an existing entry at a longer length. The markers provide branching guidance for a search of the tree, indicating whether the longer or shorter subtree should be selected. The markers are similar to prefixes of an IP address, but lack associated information fields. In each node j that is encountered in the traversal of the search tree for a given data packet, a key of length $L_j$ is extracted from the packet, corresponding to the $L_j$ most significant bits (MSB) of the DIP. This key is applied in an exact match lookup to the address prefixes of length $L_j$ that are associated with this node. In some implementations, the address prefixes and corresponding actions for each node are stored in a respective hash table. A selected hash function is applied to the key, and the result is used in looking up the corresponding entry in the hash table. Thus, in implementations that are known in the art, each address prefix in the routing table will have its own hash table entry. Considering the size of routing tables in modern IP networks (possibly more than 900,000 entries, as noted above) and that hash tables also include marker entries (around 60-70% or more entries over and above the prefixes in the hash tables), the hash tables can consume a great deal of memory, and storing all the prefixes on chip (that is beneficial for speed) is even more difficult.

Embodiments of the present invention that are described herein compress the hash tables that are used in traversal of a binary search tree that is used in packet processing, and thus reduce the memory that the hash tables consume. As explained below in detail, this compression is based on arranging the hash tables so that pure markers (i.e., entries in the hash table which only provide a marker to other prefixes and do not include a prefix themselves) are either removed from the hash tables or significantly reduced by replacing some or all of the pure makers with markers including an embedded prefix. An embedded prefix is a prefix having a prefix length longer than the marker into which the embedded prefix is inserted.

For example, a pure marker entry in the hash table of node k is converted to a marker with an embedded prefix by adding a prefix of length q (where q equals k plus n) from node q to the pure marker. The prefix of length q may then be removed from node q. The marker with the embedded prefix includes k bits corresponding to the marker and another n bits corresponding to the addition of the embedded prefix where the embedded prefix is defined by the concatenation of the k bits with the n bits. By way of a numerical example, a binary search tree includes a pure marker 138/8 at node 8, and a prefix of 138.100.17/24 at node 24. The prefix 138.100.17/24 at node 24 may be removed from the hash table of node 24 and added to the pure marker 138/8 at node 8 thereby converting the pure marker to a marker with an embedded prefix where the entry of the marker with the embedded prefix includes 8 bits corresponding to the marker 138/8 and additional 16 bits corresponding to "100.17" of the prefix 138.100.17. It is seen from the above that the bits of the marker are the same as the corresponding most significant bits of the embedded prefix. In the above example, both the marker and the embedded prefix start with 138. In some embodiments, an embedded prefix which is embedded into a pure marker is a prefix which relied upon that pure marker to be found in the binary search tree.

The binary search tree may be searched in the following manner. The k most significant bits (MSBs) of a DIP may be extracted from the DIP and used as a search key in the hash table of node k. If the k MSBs match an entry in the hash table of node k and that entry includes n additional bits corresponding to an embedded prefix (of length q, which equal k plus n), n next MSB additional bits of the DIP are extracted and compared to the n additional bits of the embedded prefix.

In some cases, the match may be equal to the LPM, in other cases the match may be saved as the best matching prefix and the binary search tree is traversed to search for any longer prefix matches, as described in disclosed embodiments.

In some embodiments, if the n additional bits match, the search for the LPM continues to nodes to the right of, and below, node k. In some embodiments, if the n additional bits match, then the match may be treated as a match at node q of the binary search tree and the search may continue to nodes to the right of, and below, node q.

In the above manner, some or all of the pure markers in the hash tables may be converted to markers with embedded prefixes thereby significantly reducing the number of pure markers in the hash tables. As each of the pure markers is used to provide branching guidance in the tree to prefixes, it is theoretically possible to convert all of the pure markers to markers with embedded prefixes thereby removing 100% of the pure markers from the hash tables. However, converting 100% of the pure markers to markers with embedded prefixes may complicate insertion of prefixes in the tree and removal of prefixes from the tree. For example, removing a single embedded prefix from the tree may require moving many entries in the tree among different nodes to remove the single embedded prefix and replace it with another embedded prefix.

Therefore, in some embodiments, pure markers are converted to markers with embedded prefixes in a top-down approach starting at the root of the tree and working down through the different nodes. At each node, a pure marker is converted to a marker with an embedded prefix by selecting an address prefix having a longest prefix from among the address prefixes relying on that pure marker in order to be found in the tree (i.e., the pure marker acts as a marker to those address prefixes). For example, if there is a pure marker at node 8 of 138/8 and two prefixes of 138.100.17/24 at node 24 and 138.100.17.10/32 at node 32, the longer prefix of 138.100.17.10/32 at node 32 is selected to be the embedded prefix of the marker at node 8.

In the above manner, most, but probably not all, of the pure markers are converted to markers with embedded prefixes. The inventors have seen that 2 or 3% of the pure markers may remain which in many implementations is an acceptable overhead while allowing for ease of adding and removing embedded prefixes.

System Description

Reference is now made to FIG. 1, which is a block diagram that schematically shows a packet router 20, in accordance with an embodiment of the invention. Router 20 is shown by way of example as a sort of packet processing apparatus in which the methods described below can be implemented. Alternatively, the principles of the present invention may be applied, mutatis mutandis, in other sorts of network elements, such as other sorts of switches and network interface devices. Router 20 can be implemented in a single integrated circuit chip or in a set of chips connected together on one or more circuit boards or other suitable media.

Router 20 comprises a plurality of interfaces 22, which receive and transmit data packets from and to a packet data network, such as an Internet Protocol (IP) network. Interfaces 22 can comprise, for example, network ports, which typically include hardware circuits that implement physical layer (PHY) and medium access control (MAC) interface functions, as are known in the art.

Packet processing circuitry 24, coupled between interfaces 22, comprises routing and switching logic configured to implement the functions described herein, along with other processing functions that are known in the art. For these purposes, packet processing circuitry 24 typically comprises hardware logic circuits, which may be hard-wired or programmable. Additionally, or alternatively, at least some of the functions of packet processing circuitry 24 may be carried out by a programmable processor under the control of suitable software or firmware. Such software may be downloaded to router 20 in electronic form, over a network, for example. Additionally, or alternatively, the software or firmware may be stored on tangible, non-transitory computer-readable media, such as optical, magnetic or electronic memory media. Although packet processing circuitry 24 is shown in FIG. 1, for the sake of simplicity, as a single functional block, in practice the functions of this circuitry can be divided among multiple circuit components, as will be apparent to those skilled in the art.

A memory 26 in router 20 can be used both as a buffer, for holding data packets in transit through the router, and to store routing tables and other data structures that are used by packet processing circuitry 24 in processing data packets. In the pictured example, router 20 receives an incoming packet 28, comprising a header 30 and a payload 32, through one of interfaces 22. Packet processing circuitry 24 reads header 30, and uses the header data in performing routing and switching functions, resulting in transmission of an outgoing packet 34 through another interface. For these purposes, packet processing circuitry 24 extracts the DIP from header 30 of incoming packet 28 and applies the DIP in searching for the longest prefix match in the routing tables, using a binary search tree, as described below.

Figure 2A:
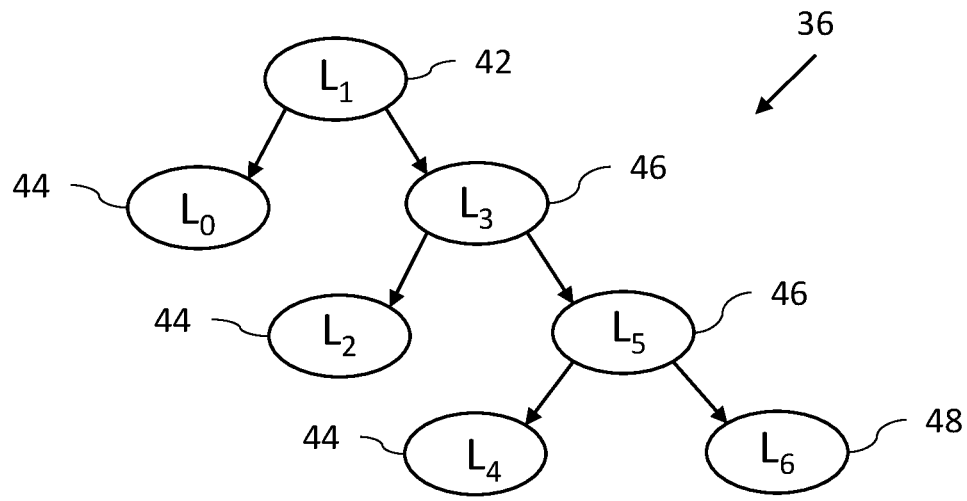
FIG. 2A is a graph that schematically illustrates a binary search tree, in accordance with an embodiment of the invention.

Reference is now made to FIG. 2A, which is a graph that schematically shows a simplified example of a binary search tree (BST) 36, in accordance with an embodiment of the invention. Further details of the construction and contents of such a tree, including prefixes, markers, and prefix/markers, are presented in the above-mentioned article by Waldvogel et al. and in U.S. Patent Application Publication 2017/0366459. Alternatively, the principles of the present invention may be applied to other types of binary search trees, not necessarily including markers of this type.

Tree 36 comprises a root node 42 (which is itself a parent node) and other parent nodes 46, with two sub-trees below each parent node. The sub-trees can contain further parent nodes 46, as well as descendant nodes 44, 48, which are leaf nodes, disposed in hierarchical levels of the subtrees. Markers are placed in the parent nodes of the binary search tree to guide packet processing circuitry 24 in accessing the descendant nodes while traversing the binary search tree in a direction from the root node to the leaf nodes. The markers in the parent nodes indicate whether longer compatible prefixes exist in a lower hierarchical level of one of the subtrees.

The nodes of binary search tree 36 are annotated according to the length $L_j$ of the corresponding prefixes, wherein the value of j runs from 0 to 6 in the pictured example. As noted earlier, j is an arbitrary index, which identifies the nodes of the search tree and does not restrict $L_j$ to any particular value. The search looks for an entry (prefix, prefix/marker or marker) matching the DIP of the current packet on each node, using a search mask that selects the $L_j$ MSBs of the DIP at each node. Specifically, packet processing circuitry 24 computes a hash over the search mask, and then uses the hash result in looking up the mask value in a corresponding hash table 38 (FIG. 1). If the node contains a prefix that is not designated to function as a marker, and that prefix matches the DIP, then the process ends. If a prefix/marker or a marker matches, then the search moves to the right branch in the sub-tree below the present node. Otherwise, the search moves to the left. The process ends in all cases when a leaf node is encountered.

Reference is again made to FIG. 1. Reference is also made to FIG. 2A.

The memory 26 is configured to store a representation of a routing table for the network as the binary search tree (BST) 36 of address prefixes. The binary search tree 36 is ordered by prefix lengths, such that each node j in the binary search tree 36 corresponds to a respective prefix length $L_j$.

The memory 26 is configured to store for each node j in the binary search tree 36, a respective hash table 38 comprising entries representing the address prefixes of length $L_j$. Each address prefix comprises $L_j$ most significant bits (MSB), and each entry in the respective hash table 38 comprises a matching value corresponding to a forwarding action (e.g., the action field 66 of FIG. 3).

Figure 2B:
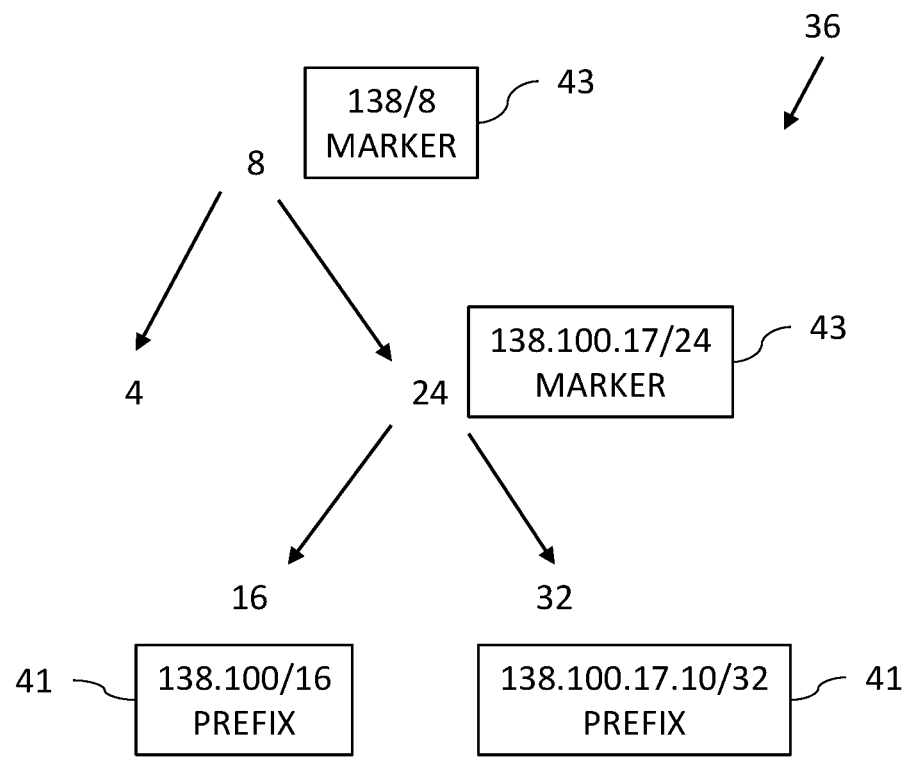
FIGS. 2B-D are example graphs that schematically illustrate embodiments of the invention.

Reference is now made to FIG. 2B. FIG. 2B shows an example BST 36. For the sake of simplicity let us consider two prefixes 41 in the BST 36. The two prefixes 41 are 138.100/16 at node 16 and 138.100.17.10/32 at node 32. The entries in the BST 36 may include a marker 138/8 at node 8, a prefix 138.100/16 at node 16, a marker 138.100.17/24 at node 24, and a prefix at 138.100.17.10/32 at node 32. In total there are four entries: two prefixes 41 and two markers 43. A search for 138.100.23.5 would match the marker at node 8 and the search would continue right to node 24 where it would not match the marker. Then, the search would go left to node 16 and match the prefix there. It can be seen that markers are needed to guide the search to the LPM.

Figure 2C:
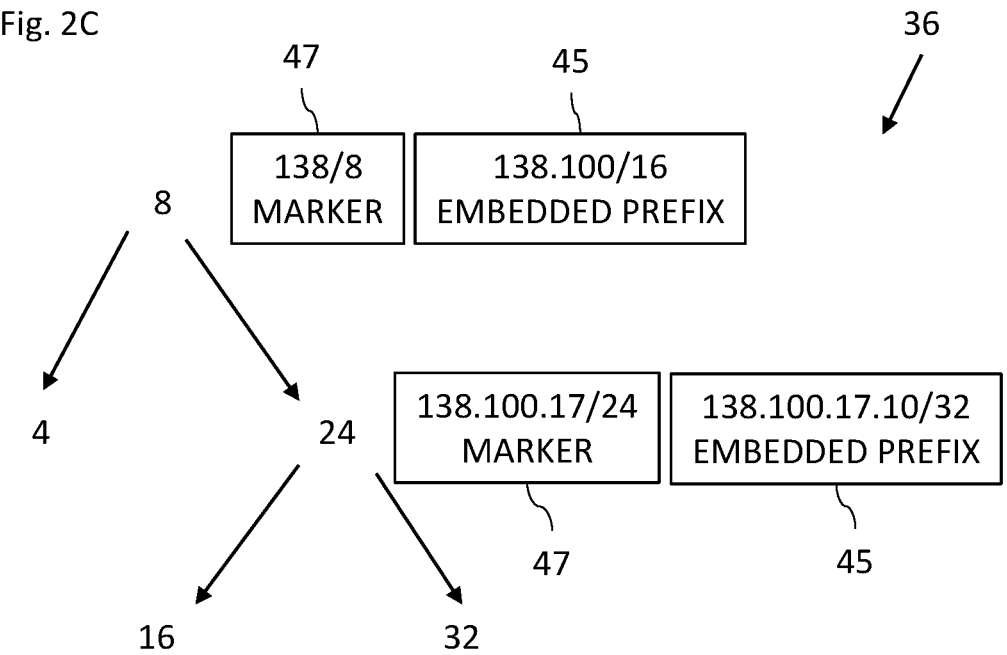

Reference is now made to FIG. 2C. Reference is also made to FIG. 1. FIG. 2C shows an example BST 36. The memory 26 is configured to store markers 47 with respective embedded prefixes 45 in the BST 36. In other words, each marker 47 includes an associated embedded prefix 45. In some embodiments, the BST 36 may include one or more pure markers 43.

The markers 47 with the embedded prefixes 45 allow storing a prefix with a marker entry, which belongs to a node with a shorter length than the prefix which is to be embedded in the entry of the marker. For example, a prefix from node 16 may be stored with a marker of node 8 in a single hash table entry. Using embedded markers does not affect the correctness of the LPM matching method as the embedded prefix is checked for all lookups that checked it prior to becoming an embedded prefix. The difference is that now at node 8 in addition to the marker, the additional bits of the embedded prefix are stored to perform the comparison of the prefix.

In the example, of FIG. 2B the prefixes 41 may be embedded into the markers 43 giving the markers 47 and associated embedded prefixes 45 as shown in FIG. 2C. In FIG. 2C, at node 8, the marker 138/8 is embedded with the prefix 138.100/16, and at node 24, the marker 138.100.17/24 is embedded with the prefix 138.100.17.10/32. Therefore, compared to the BST 36 of FIG. 2B where 4 entries are needed in the BST 36, only two entries are needed in the BST 36 of FIG. 2C. The marker 47 at node 24 is not needed (and may be removed) in the example as shown in FIG. 2C as there are no entries at node 32. However, if there are relevant entries at node 32, the marker 47 at node 24 is used.

In the example of FIG. 2C, a lookup for 138.100.17.10 would match the marker and embedded prefix at node 8. The lookup would then continue to the right of the BST 36 and match the embedded prefix at node 24. As node 32 is a leaf node, the embedded prefix at node 24 is the LPM.

A lookup for 138.100.17.23 would match the embedded prefix of 138.100/16 at node 8 but would not match the embedded prefix at node 24 and thus its BMP when it reaches the leaf node 16 would be 8 and thus the LPM would be 138.100/16 embedded in the node 8.

In some embodiments no pure markers 43 are needed if all pure markers are converted to markers with embedded prefixes as each pure marker is associated with a longer matching prefix that can be embedded on that pure marker making it a marker with an embedded prefix. Therefore, potentially the entry overhead due to markers can be removed completely for all trees. Therefore, in some embodiments, the BST 36 does not include any marker without an embedded prefix. In other words, each marker in the BST 36 is included in a hash table entry with an embedded prefix such that the BST 36 does not include any pure markers. However, supporting embedded prefixes (without any pure markers) adds complexity to the insertion, removal, lookup and tree change operations.

One of the markers 47 with the embedded prefix 45 is now described by way example. The memory 26 is configured to store the marker 47 with the embedded prefix 45 as one of the entries in the respective hash table 38 of node k corresponding to a prefix length k. The marker 47 with the embedded prefix includes: (a) k marker bits providing a marker for at least one address prefix in the respective hash table of another one (or more) of the nodes corresponding to a prefix length greater than k; (b) n additional bits, such that the k marker bits concatenated with the n additional bits provide an address prefix in the respective hash table of node k instead of in the respective hash table of node q corresponding to a prefix length q (where q is equal to k plus n); and (c) a forwarding action. In some embodiments, the marker with the embedded prefix includes an action field to check the n additional bits. An example of the action field to check the n additional bits is described with reference to FIG. 3 as the prefix difference field 60 which provides a value to the number of n additional bits in the hash table entry.

The packet router 20 may also include a controller 25 configured to: generate the markers 47 with the respective embedded prefix 45 responsively to one of the address prefixes in the respective hash table of node q; and remove that address prefix from the respective hash table of node q. Subsequently, if the embedded prefix 45 needs updating the controller 25 is configured to update the marker 47 with the embedded prefix 45 to refer to another one of the address prefixes instead of referring to that address prefix.

Subsequently, if the embedded prefix 45 needs removing, the controller 25 is configured to remove the n addition bits from the marker with the embedded prefix such that the marker with the embedded prefix becomes a pure marker (i.e., a marker without an embedded prefix).

Figure 3:
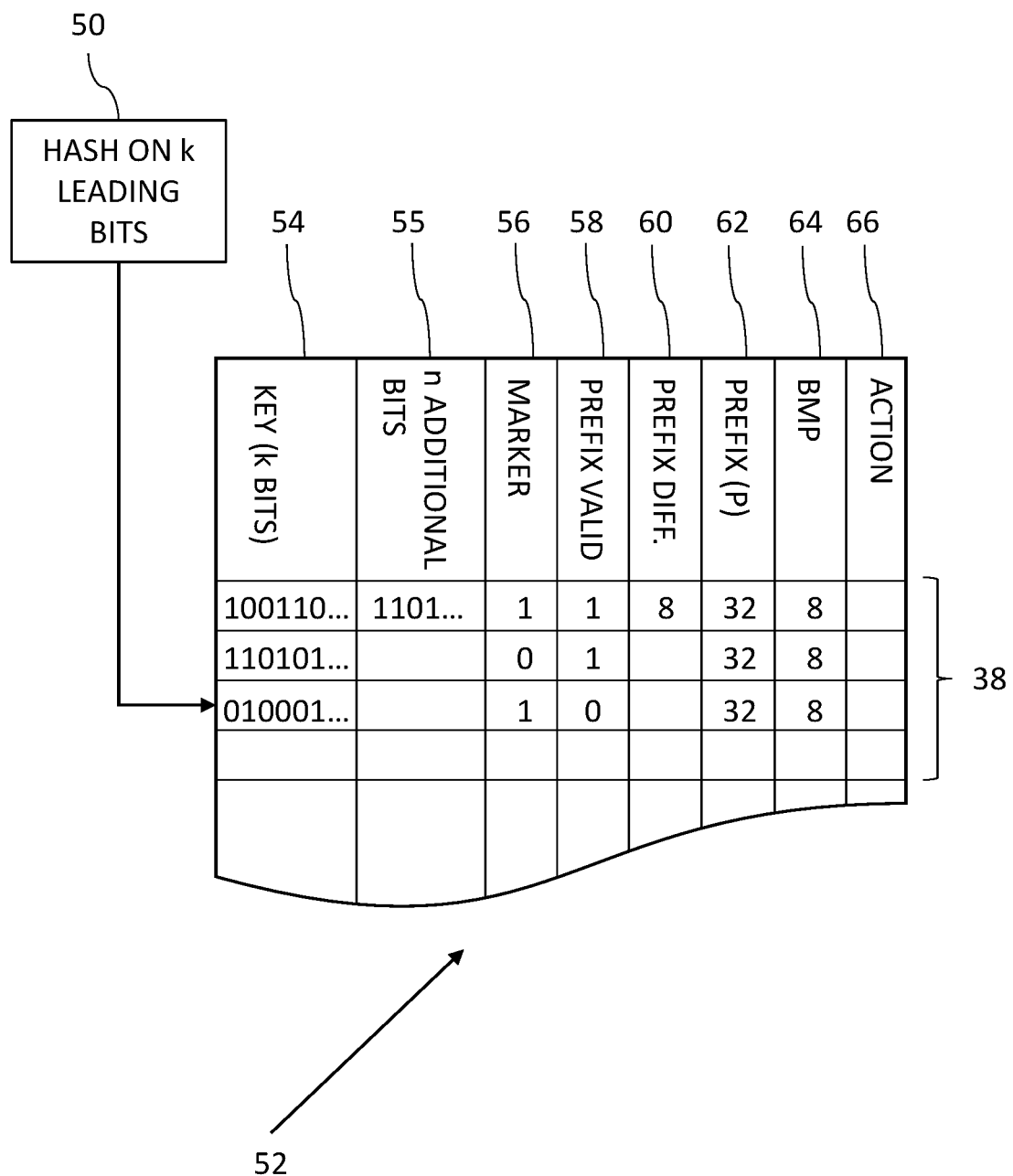
FIG. 3 is a block diagram that schematically illustrates a hash table, in accordance with an embodiment of the invention.

Packet processing circuitry 24 carries out the search for the longest prefix match using the hash tables 38 of the BST 36 that are stored in memory 26. An example hash table is shown in FIG. 3. Each entry in the respective hash table comprises a matching tag corresponding to the $L_j$ MSBs of one of the address prefixes in the routing table and an associated action code. Each entry may include other fields related to flags and embedded prefixes as described in more detail below with reference to FIG. 3. The action codes in the present example point to entries in an action table 40, which typically identify the egress interface through which outgoing packet 34 is to be transmitted, as well as other operations to be applied to the packet, such as changes in the packet header fields. When packet processing circuitry 24 has finished traversing BST 36 and found the longest prefix match for data packet 28, it processes the data packet in accordance with the corresponding action code.

The search for the LPM is described in more detail below.

Upon receiving the incoming packet 28 through one of the interfaces 22, the packet processing circuitry 24 is configured to: traverse the binary search tree 36 to find a longest prefix match between the destination address (e.g., DIP of the incoming packet 28) and the address prefixes in the BST 36; extract, at each node j that is traversed, a key of length $L_j$ from the destination address; and perform a hash lookup in the respective hash table with the key to find a matching entry. In general, if there is a match, the BST 36 is traversed to the right, and if there is no match, the BST 36 is traversed to the left.

For one of the markers 47 with an associated embedded prefix 45 at node k, the packet processing circuitry 24 is configured to: compare the key of length k with the k marker bits of the marker 47 with the embedded prefix 45; upon a match of the key with the k marker bits, extract an additional n bits from the destination address; and compare the extracted n bits of the destination address with the n additional bits of the marker 47 with the embedded prefix 45. In some embodiments, the packet processing circuitry is configured to compare the extracted n bits of the destination address with the n addition bits of the marker with the embedded prefix responsively to the action field (e.g., the prefix difference field 60 of FIG. 3) to check the n additional bits.

The packet processing circuitry 24 is configured to process the incoming packet 28 in accordance with the forwarding action indicated by the matching entry that corresponds to the longest prefix match. If one of the embedded prefixes provides the LPM, then the packet processing circuitry 24 is configured to process the incoming packet 28 in accordance with the forwarding action of the marker 47 with the embedded prefix 45 responsively to the extracted n bits of the destination address matching the n additional bits of the marker 47 with the embedded prefix 45.

Figure 2D:
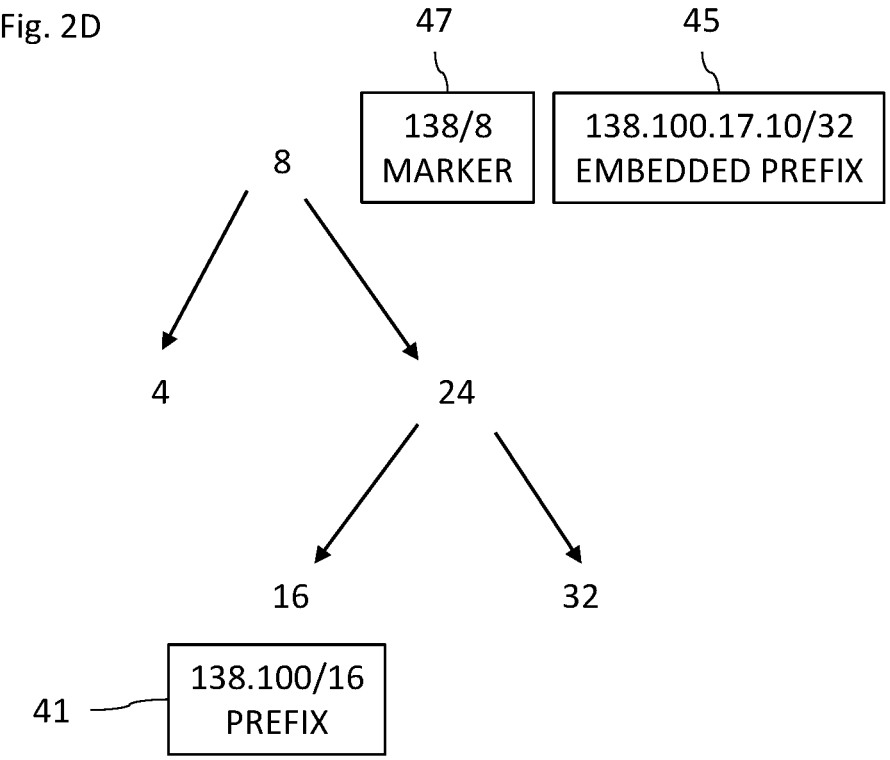

Reference is now made to FIG. 2D. As mentioned previously, converting 100% of the pure markers 43 (FIG. 2B) to markers 47 with embedded prefixes 45 (FIG. 2C) may complicate insertion of prefixes in the tree 36 and removal of prefixes from the tree 36. For example, removing a single embedded prefix from the tree 36 may require moving many entries in the tree 36 among different nodes to remove the single embedded prefix and replacing it with another embedded prefix.

Therefore, in some embodiments, pure markers are converted to markers with embedded prefixes in a top-down approach starting at the root of the tree 36 and working down through the different nodes. At each node, a pure marker is converted to a marker with an embedded prefix by selecting an address prefix having a longest prefix from among the address prefixes relying on that pure marker in order to be found in the tree (i.e., the pure marker acts as a marker to those address prefixes). For example, if there is a pure marker at node 8 of 138/8 and two prefixes of 138.100/16 at node 16 and 138.100.17.10/32 at node 32 as shown in FIG. 2B, the longest prefix of 138.100.17.10/32 at node 32 (block 45) is selected to be the embedded prefix to be embedded in the marker (block 47) at node 8 as shown in FIG. 2D with the prefix of 138.100/16 (block 41) remaining at node 16. Using the above method, the BST 36 may include one or more pure markers (e.g., markers without an embedded prefix).

Therefore, the controller 25 is configured to select an address prefix (for embedding into a marker) from a selection of the address prefixes responsively to that address prefix having a longest prefix from among the selection of the address prefixes.

Reference is now made to FIG. 3, which is a block diagram that schematically illustrates hash table 38 for a given node in binary search tree 36, in accordance with an embodiment of the invention. Hash table 38 comprises multiple entries 52, which are ordered in the table and accessed according to the value of a predefined hash function 50, which is computed over a key consisting of the k most significant (leading) bits of the prefix (or DIP) in question, wherein for any node j in binary search tree 26, $k=L_j$. For the sake of simplicity, table 38 is configured as a single-way cache, meaning that there is a single entry corresponding to each hash value, and thus to each k-bit key. In alternative embodiments (not shown in the figures), a multi-way hash table may be used, in which a given hash value can map to multiple entries in the table.

Each entry 52 in hash table 38 may comprise a matching tag 54, n additional bits 55, a marker bit 56, a prefix valid bit 58, a prefix difference field 60, a prefix (P) field 62, a BMP field 64, and an action field 66. The additional bits 55 (if applicable) give the n additional bits such that the k bits concatenated with the n additional bits is equal to the embedded prefix 45 of the current entry 52. The marker bit 56 indicates if there are longer prefixes compatible to the prefix included in the current entry 52. The prefix valid bit 58 indicates if the entry 52 stores a prefix. The prefix difference field 60 indicates the difference in the length of the prefix of the entry 52 compared to the standard length of this node. When the prefix difference field 60 is equal to zero, the prefix belongs to this node, and when the prefix difference field 60 is greater than zero, the prefix is longer than this node, meaning that the prefix is an embedded prefix. The prefix (P) field 62 provides the value of the prefix (e.g., 32 bits for IPv4). In some embodiments, the prefix (P) field 62 is not included and the value of the prefix may be inferred from the matching tag 54 and the additional bits 55. The BMP field 64 provides the length of the best prefix match for this node. The action field 66 provides the action (e.g., forwarding action) associated with this entry 52. The action field 66 may comprise a pointer to an appropriate entry in action table 40.

Figure 4A:
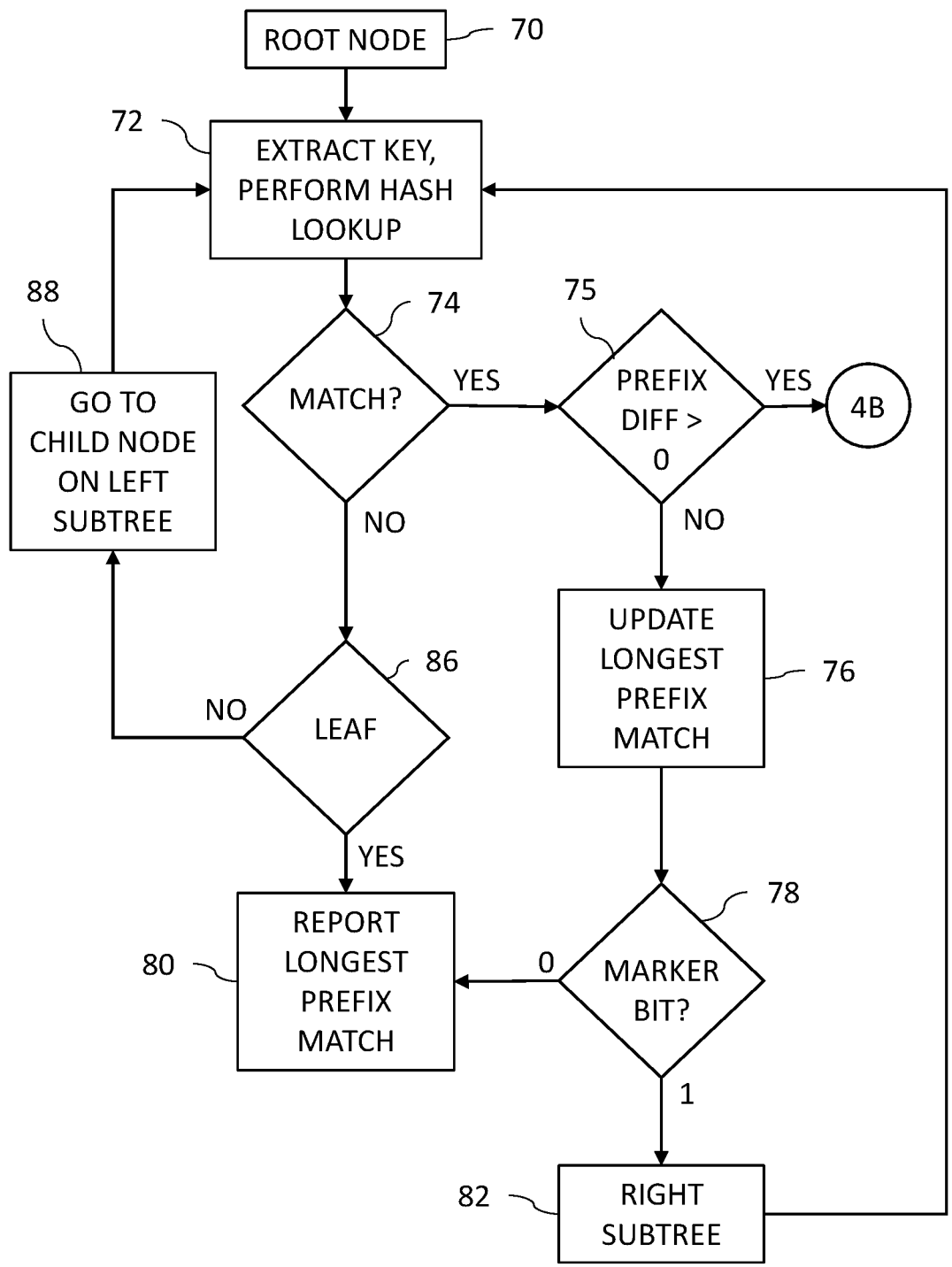
FIGS. 4A and 4B is a flow chart that schematically illustrates a method for longest prefix matching using a binary search tree and compressed hash tables, in accordance with an embodiment of the invention.

Reference is now made to FIG. 4A, which is a part of a flow chart that schematically illustrates a method for longest prefix matching using a binary search tree and compressed hash tables, in accordance with an embodiment of the invention. The method is described, for the sake of convenience and clarity, with reference to router 20, as shown in FIG. 1, and the data structures shown in FIGS. 2A and 3, although it may alternatively be implemented in other sorts of network elements and modified data structures, as noted above. The method assumes as its starting point that binary search tree 36, representing a routing table, has been established in memory 26 as explained above, with pure markers and/or markers with embedded prefixes in the nodes, along with a respective hash table 38 for each node in the binary search tree.

The method is initiated at root node 42 (FIG. 2A) when packet 28 (FIG. 1) is received through one of interfaces 22 (FIG. 1), at a search initiation step (block 70). At a hash lookup step (block 72), packet processing circuitry 24 extracts the DIP from header 30 for use in the prefix matching process and computes the appropriate hash function over the k MSB of the DIP, wherein k=L$_j$. Packet processing circuitry 24 uses the hash result in accessing the appropriate hash table 38 for the current node in memory 26.

Next, at a match decision step (block 74), packet processing circuitry 24 determines whether the hash table contains a match of compatibility in the current node between the DIP of the packet and matchable prefix content (e.g., matching tag 54) in the current node. If the determination at step of block 74 is affirmative, then the packet processing circuitry 24 checks (at a decision step of block 75) the prefix difference field 60 to determine if the prefix difference field 60 is greater than zero. If the prefix difference field 60 is greater than zero, processing continues with the step of block 90 described in more detail below with reference to FIG. 4B. If the prefix difference field 60 is not greater than zero, the best prefix match found thus far in the search is updated according to the match, at an update step of block 76. Packet processing circuitry 24 then determines whether the match is a marker (e.g., based on a value of the marker bit 56 of FIG. 3) at a marker checking step of block 78. If the determination at step of block 78 is negative (e.g., the value of the marker bit 56 is zero), the search terminates at a final step of block 80 where the longest prefix match recorded in iterations through step of block 74 is reported, and the corresponding entry 52 in the corresponding hash table 38 is used to identify the action in table 40 that is to be applied in processing the packet.

On the other hand, if the determination at step of block 78 is affirmative (e.g., the value of the marker bit 56 is one), meaning that a marker was found in the matching entry, then control proceeds to a right subtree selection step of block 82. The destination of the next step of the search is set to be the child node in the right subtree of the current node. After performing step of block 82, control returns to step of block 72 to iterate the procedure.

If the determination at decision step of block 74 was negative, i.e., no matchable prefix (or marker) content was found in the current node, then packet processing circuitry 24 determines whether the current node is a leaf node, at a leaf checking step of block 86. If the determination at step of block 86 is affirmative, then the search ends, and control proceeds to final step of block 80. In this case, the longest prefix match so far recorded is used in identifying the action to be applied to the packet. Otherwise, control proceeds to a left subtree selection step of block 88, where the next step in the search is at the child node in the left subtree of the current node. Control then returns to step of block 72 for another iteration.

Figure 4B:
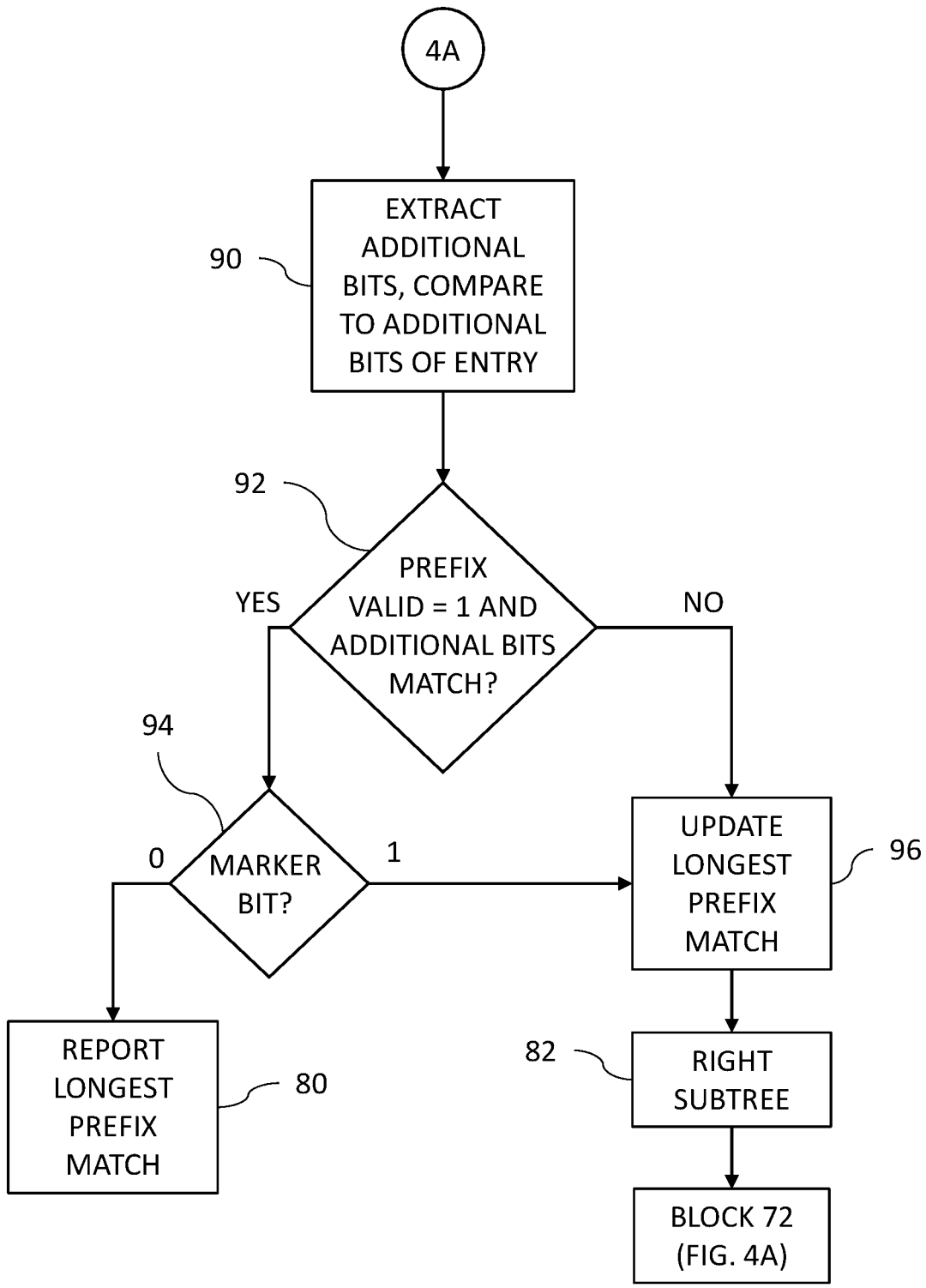

Reference is now made to FIG. 4B. At the step of block 90, the packet processing circuitry 24 extracts n addition bits from the DIP of the packet (i.e., the n next bits following the k original MSBs of the DIP) and compares the extracted n addition bits with the additional bits 55 of the matching entry 52. The packet processing circuitry 24 checks if the prefix valid bit 58 is equal to one and that the n addition bits match at a decision step of block 92. If the prefix valid bit 58 is equal to one and the n additional bits match, the marker bit 56 is checked at a decision step of block 94. If the marker bit 56 is equal to zero, control proceeds to final step of block 80 (described above). If the marker bit is equal to one, the best prefix match found thus far in the search is updated according to the match, at update step of block 96 and control proceeds to the right subtree selection step of block 82 in which the destination of the next step of the search is set to be the child node in the right subtree of the current node. After performing step of block 82, control returns to step of block 72 (FIG. 4A) to iterate the procedure.

If the prefix valid bit 58 is equal to zero or then additional bits do not match at decision step of block 92, control continues with update step of block 96, followed by right subtree selection step of block 82 and then step of block 72.

After reaching step of block 80, by whatever path through the method shown in FIGS. 4A-B, packet processing circuitry 24 reads the required action from table 40 and processes the packet accordingly.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. Packet processing apparatus, comprising:
   a plurality of interfaces configured to receive and transmit data packets from and to a network;
   a memory, which is configured to:
      store a representation of a routing table for the network as a binary search tree of address prefixes, the binary search tree being ordered by prefix lengths and having nodes, such that each node j of the nodes in the binary search tree corresponds to a respective prefix length Lj;
      store for each node j in the binary search tree, a respective hash table comprising entries representing the address prefixes of length Lj, each address prefix comprising Lj most significant bits (MSB), and each entry in the respective hash table comprising a matching value corresponding to a forwarding action; and
      store a marker with an embedded prefix as one of the entries in the respective hash table of a first one of the nodes, corresponding to a prefix length k, the marker with the embedded prefix including: (a) k marker bits providing a marker for a first address prefix in the respective hash table of a second one of the nodes corresponding to a prefix length greater than k; (b) n additional bits, such that the k marker bits concatenated with the n additional bits provide a second one of the address prefixes in the respective hash table of the first node instead of in the respective hash table of a third one of the nodes corresponding to a prefix length k plus n; (c) a forwarding action; and
   packet processing circuitry configured, upon receiving through one of the interfaces a data packet having a destination address, to:
      traverse the binary search tree to find a longest prefix match between the destination address and the address prefixes, extract, at each node j that is traversed, a key of length Lj from the destination address, and perform a hash lookup in the respective hash table with the key to find a matching entry;

for the first node: compare the key with the k marker bits of the marker with the embedded prefix; upon a match of the key with the k marker bits, extract an additional n bits from the destination address; and compare the extracted n bits of the destination address with the n additional bits of the marker with the embedded prefix; and process the data packet in accordance with the forwarding action indicated by the matching entry that corresponds to the longest prefix match.

2. The apparatus according to claim 1, wherein:
the marker with the embedded prefix includes an action field to check the n additional bits; and
the packet processing circuitry is configured to compare the extracted n bits of the destination address with the n additional bits of the marker with the embedded prefix responsively to the action field to check the n additional bits.

3. The apparatus according to claim 1, wherein the packet processing circuitry is configured to process the data packet in accordance with the forwarding action of the marker with the embedded prefix responsively to the extracted n bits of the destination address matching the n additional bits of the marker with the embedded prefix.

4. The apparatus according to claim 1, wherein the binary search tree does not include any marker without an embedded prefix.

5. The apparatus according to claim 1, further comprising a controller configured to: generate the marker with the embedded prefix responsively to the second address prefix in the respective hash table of the third node; and remove the second address prefix from the respective hash table of the third node.

6. The apparatus according to claim 5, wherein the controller is configured to select the second address prefix from a selection of the address prefixes responsively to the second address prefix having a longest prefix from among the selection of the address prefixes.

7. The apparatus according to claim 6, wherein the binary search tree includes at least one marker without an embedded prefix.

8. The apparatus according to claim 7, wherein the controller is configured to remove the n additional bits from the marker with the embedded prefix such that the marker with the embedded prefix becomes a marker without an embedded prefix.

9. The apparatus according to claim 7, wherein the controller is configured to update the marker with the embedded prefix to refer to a third one of the address prefixes instead of referring to the second address prefix.

10. A packet processing method, comprising:
receiving and transmitting data packets from and to a network;
storing a representation of a routing table for the network as a binary search tree of address prefixes, the binary search tree being ordered by prefix lengths and having nodes, such that each node j of the nodes in the binary search tree corresponds to a respective prefix length Lj;
storing for each node j in the binary search tree, a respective hash table comprising entries representing the address prefixes of length Lj, each address prefix comprising Lj most significant bits (MSB), and each entry in the respective hash table comprising a matching value corresponding to a forwarding action;
storing a marker with an embedded prefix as one of the entries in the respective hash table of a first one of the nodes, corresponding to a prefix length k, the marker with the embedded prefix including: (a) k marker bits providing a marker for a first address prefix in the respective hash table of a second one of the nodes corresponding to a prefix length greater than k; (b) n additional bits, such that the k marker bits concatenated with the n additional bits provide a second one of the address prefixes in the respective hash table of the first node instead of in the respective hash table of a third one of the nodes corresponding to a prefix length k plus n; (c) a forwarding action; and upon receiving a data packet having a destination address:
traversing the binary search tree to find a longest prefix match between the destination address and the address prefixes;
extracting, at each node j that is traversed, a key of length Lj from the destination address;
performing a hash lookup in the respective hash table with the key to find a matching entry;
for the first node: comparing the key with the k marker bits of the marker with the embedded prefix; upon a match of the key with the k marker bits, extracting an additional n bits from the destination address; and comparing the extracted n bits of the destination address with the n additional bits of the marker with the embedded prefix; and
processing the data packet in accordance with the forwarding action indicated by the matching entry that corresponds to the longest prefix match.

11. The method according to claim 10, wherein the marker with the embedded prefix includes an action field to check the n additional bits, the method further comprising comparing the extracted n bits of the destination address with the n additional bits of the marker with the embedded prefix responsively to the action field to check the n additional bits.

12. The method according to claim 10, wherein processing includes processing the data packet in accordance with the forwarding action of the marker with the embedded prefix responsively to the extracted n bits of the destination address matching the n additional bits of the marker with the embedded prefix.

13. The method according to claim 10, wherein the binary search tree does not include any marker without an embedded prefix.

14. The method according to claim 10, further comprising:
generating the marker with the embedded prefix responsively to the second address prefix in the respective hash table of the third node; and
removing the second address prefix from the respective hash table of the third node.

15. The method according to claim 14, further comprising selecting the second address prefix from a selection of the address prefixes responsively to the second address prefix having a longest prefix from among the selection of the address prefixes.

16. The method according to claim 15, wherein the binary search tree includes at least one marker without an embedded prefix.

17. The method according to claim 16, further comprising removing the n additional bits from the marker with the embedded prefix such that the marker with the embedded prefix becomes a marker without an embedded prefix.

18. The method according to claim 16, further comprising updating the marker with the embedded prefix to refer to a third one of the address prefixes instead of referring to the second address prefix.

\* \* \* \* \*